United States Patent [19]

Lindquist

[11] 4,392,063

[45] Jul. 5, 1983

[54] TURBINE INSTALLATION COMPRISING A TURBINE INSTALLED IN A DUCT

[75] Inventor: Herman A. Lindquist, San Rafael, Calif.

[73] Assignee: Voest-Alpine Aktiengesellschaft, Linz, Austria

[21] Appl. No.: 246,581

[22] Filed: Mar. 23, 1981

[51] Int. Cl.$^3$ .............................................. F03B 11/02
[52] U.S. Cl. ...................................... 290/54; 290/52; 415/109; 415/118; 415/201
[58] Field of Search ........ 415/118, 201, 142, 109–112; 290/52, 43, 54

[56] References Cited

U.S. PATENT DOCUMENTS 429,833  6/1890  Bantz .................................. 415/201

FOREIGN PATENT DOCUMENTS 912320  5/1954  Fed. Rep. of Germany .
1050248  8/1953  France .
1192808  4/1959  France .
2337270  7/1977  France .

Primary Examiner—J. V. Truhe
Assistant Examiner—Shelley Wade
Attorney, Agent, or Firm—Kurt Kelman

[57] ABSTRACT

A turbine installation comprises flow passage-defining means defining an inlet chamber and a runner chamber and including two juxtaposed interconnecting passages which connect the inlet chamber and the runner chamber and are disposed on opposite sides of an axial center plane, and spaced apart in an intermediate part of their length, a turbine runner rotatably mounted in said runner chamber, an electric generator disposed outside the flow passage-defining means, and an output mechanism extending through the space between the two interconnecting passages, and operatively connecting the runner to the generator. In order to ensure that those parts of the structure which may require to be serviced will be easily accessible, the interconnecting passages are defined by two pipelines, each of which consists of a plurality of straight pipe sections and has a cross-section which is substantially the same as that part of the cross-section of the inlet chamber at its outlet which is disposed on the same side of said center plane as the respective pipeline. The turbine shaft is mounted in a coaxial carrying tube, which extends through both pipelines and protrudes into the space between the pipelines.

4 Claims, 6 Drawing Figures

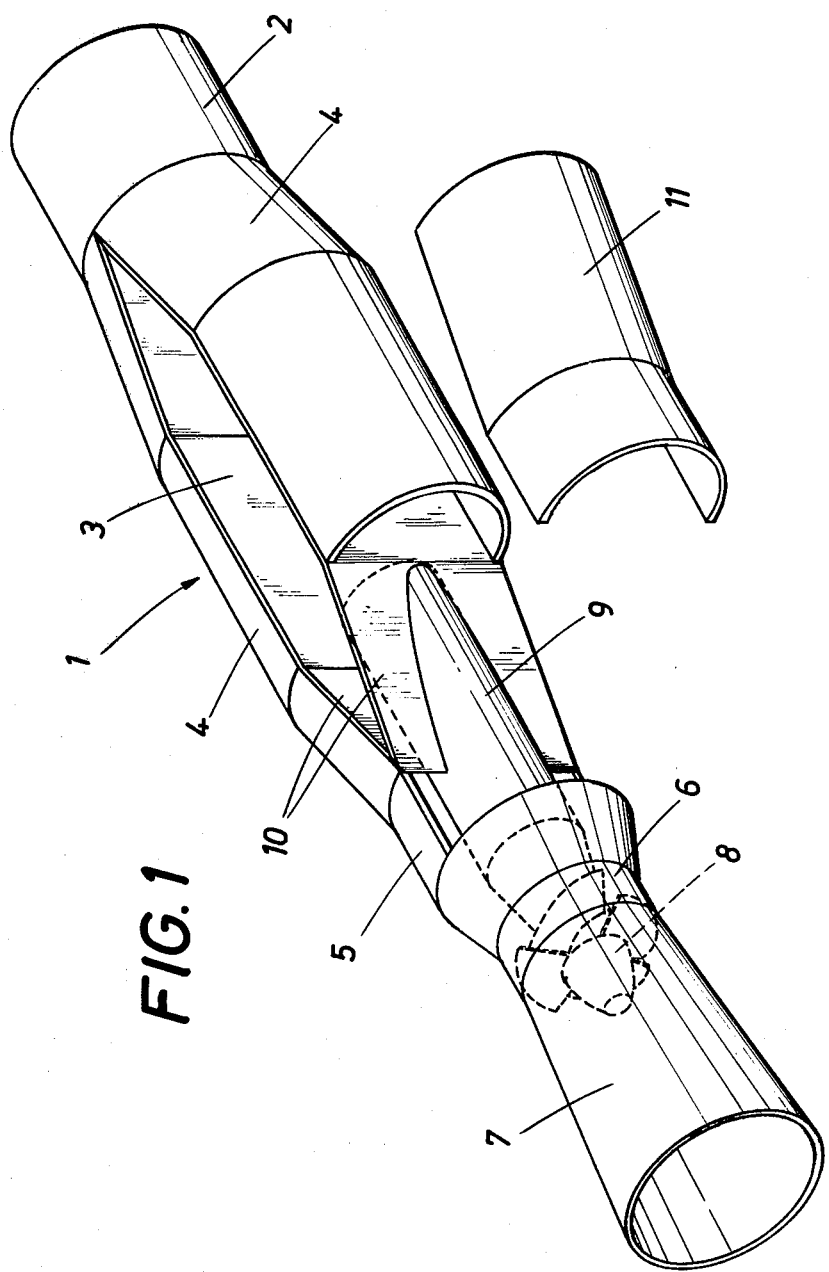

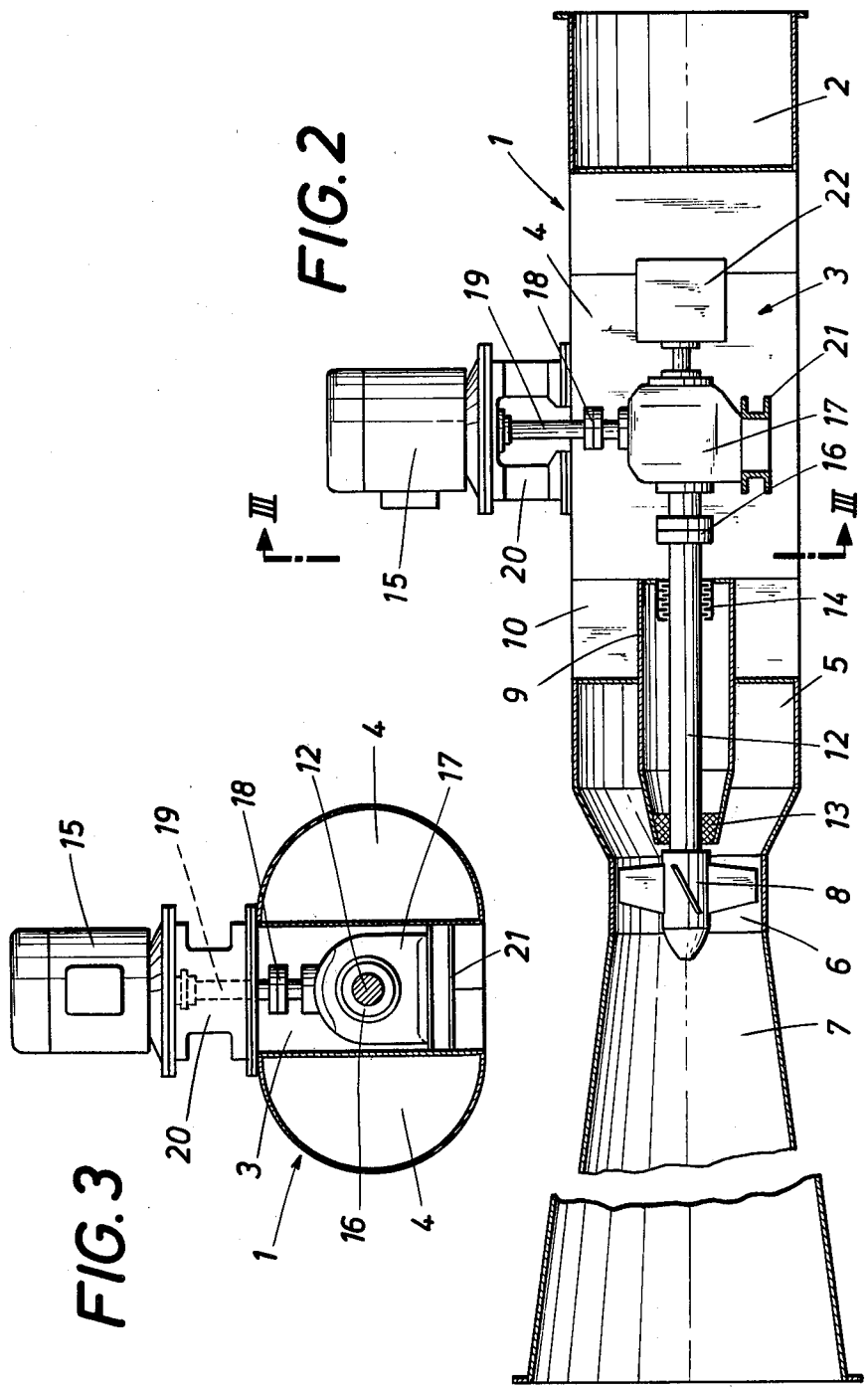

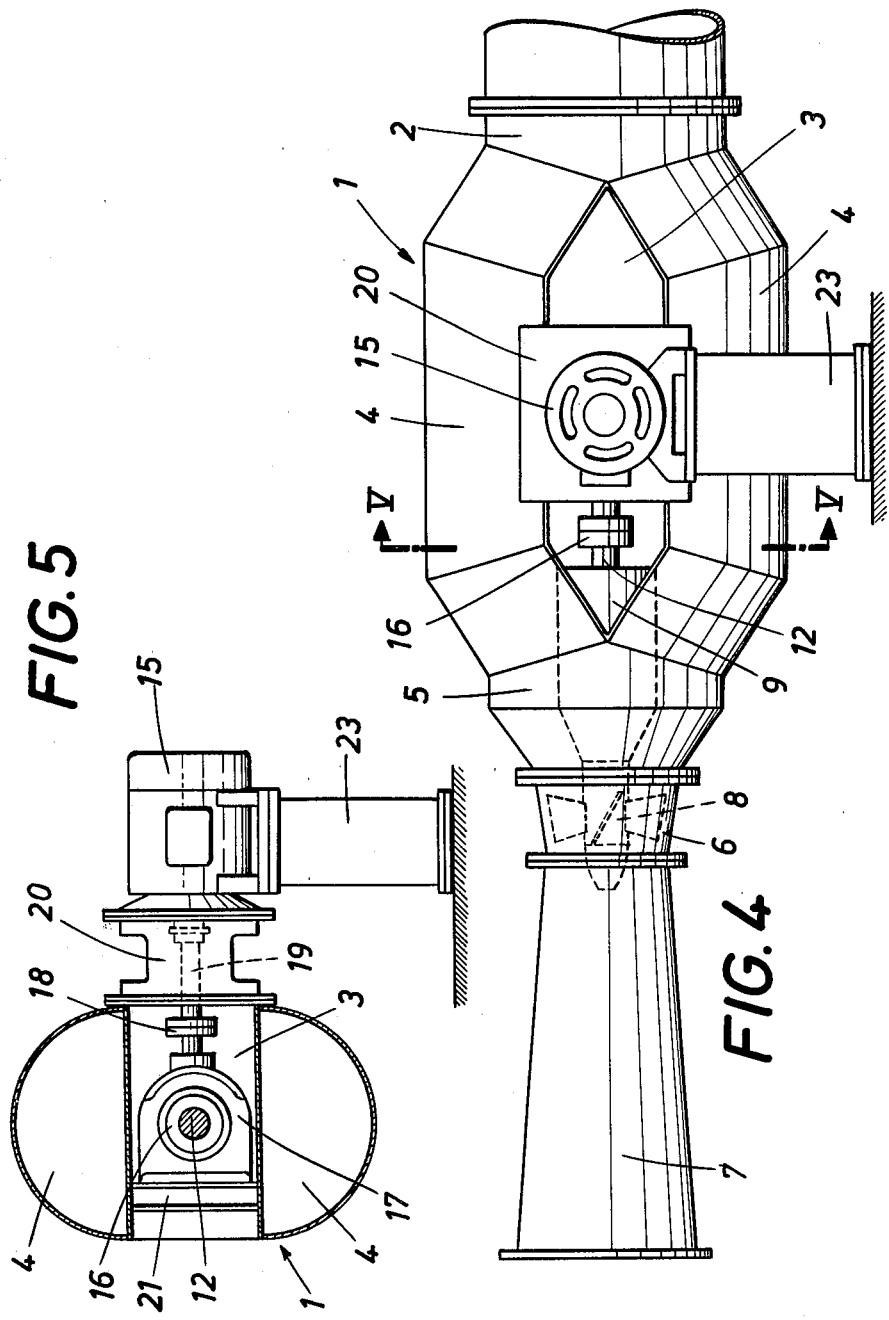

TURBINE INSTALLATION COMPRISING A TURBINE INSTALLED IN A DUCT

This invention relates to a turbine installation comprising flow passage-defining means defining an inlet chamber and a runner chamber and including two juxtaposed pipelines which connect the inlet chamber and the runner chamber and are disposed on opposite sides of an axial center plane and spaced apart in an intermediate part of their length, a turbine runner rotatably mounted in said runner chamber, an electric generator disposed outside the flow passage-defining means, and an output mechanism extending through the space between the two pipelines and operatively connecting the runner to the generator.

In conventional turbine installations comprising a turbine installed in a duct, the runner and the generator constitute a central section, which is enclosed in a housing that is anchored in the duct by means of radial arms and the interior of which can be walked in for assembling and repair work. In these structures, one of the radial arms is hollow and serves as an access shaft. Whereas that design has proved quite satisfactory in large turbine installations comprising a turbine installed in a duct, the access to the central section becomes increasingly difficult as the size of the machine is decreased. For this reason that design of turbine installations comprising a turbine installed in a duct is not suitable for medium- and small-size installations.

In another design, which is known from German Patent Specification No. 912,320, only the turbine runner is mounted in a center section housing and the generator is accommodated in a hollow shaft, which extends through the duct and divides it into two flow passages. As the hollow shaft itself occupies a relatively large space, the access to the generator through the hollow shaft will also be difficult if the design is to be adopted for medium-size and small turbine installations comprising a turbine mounted in a duct. If the generator is disposed outside the duct and operatively connected to the turbine runner by bevel gear train, the generator will be easily accessible but the access to the bevel gear train accommodated in the hollow shaft will be difficult.

For this reason it is an object of the invention to provide a turbine installation which includes a turbine installed in a duct and which is of the kind described first hereinbefore and so designed that even when it has a medium or low power capacity all parts of the structure which may require to be serviced will easily be accessible. Besides, such turbine installation including a turbine installed in a duct should be capable of utilizing also the head of water mains for a recovery of energy.

This object is accomplished according to the invention in that the interconnecting passages are defined by two pipelines, each of which consists of a plurality of straight pipe sections and has a cross-section which is substantially the same as that part of the cross-section of the inlet chamber at its outlet which is disposed on the same side of said center plane as the respective pipeline, that the runner is non-rotatably connected to a turbine shaft, which is mounted in a coaxial carrying tube, which extends through and is sealed in both said pipelines in end portions thereof which converge to form a junction near said runner chamber, and that said carrying tube protrudes into the space between said pipelines.

Because the driving water is fed to the runner chamber in two spaced apart pipelines, each of which consists of a plurality of straight pipe sections, the two pipelines define between them a space which is easily accessible and in which the drive means for controlling the turbine can be accommodated and through which the output mechanism connected to the turbine may extend. Even though that space is relatively small, it is easily accessible because there is no hollow shaft that extends through the flow passage but the driving water is fed to the turbine runner in two pipelines, each of which consists of a plurality of pipe sections. The total cross-section of these two pipelines is substantially the same as the cross-section of the inlet chamber at its outlet so that the conditions of flow are not greatly altered by the fact that the flow passage is divided into two pipelines, particularly because only a small diversion of flow is required by the division into two pipelines. The space between the two pipelines need not be large because it is easily accessible.

The two pipelines can easily be manufactured because they are composed each of a plurality of straight pipe sections so that the generatrices consist of straight lines. The pipelines can be connected to the inlet chamber without need for complicated and expensive junction fittings. This is due to the fact that the cross-section of each pipe section is substantially the same as that part of the cross-section of the inlet chamber at its outlet which is left free by the respective other pipeline so that the total cross-section of the two pipelines is substantially the same as the cross-section of the inlet chamber at its outlet. As the inlet chamber is generally defined by a pipe which is circular in cross-section so that its cross-section at its outlet will also be circular, the pipelines will be semicircular in cross-section. In that case, the pipe sections for the two pipelines can be made in that circular-section pipes are bisected along axial planes.

Because the total cross-section remains the same adjacent to the two pipelines and the flow is only slightly diverted, such design can be used also for installations having high inlet velocities and operating under high pressures so that such turbine installations comprising a turbine installed in a duct can be used also where the heads are large. Besides, the installation can easily be installed in existing pipelines because it will be sufficient to replace part of that pipeline by the flow passage-defining means of the turbine installation.

Particularly simple conditions are ensured by the provision of the tube which carries the turbine shaft because that carrying tube reduces the cross-section of flow for the driving water so that the latter is accelerated in the desired manner before entering the runner chamber.

The carrying tube acts to stiffen the confronting planar walls of the two pipelines in the region in which the driving water is accelerated. Further downstream, the carrying tube tends to reduce the turbulence of the water flowing to the runner wheel. Although the carrying tube is straight, favorable conditions of flow can be ensured because the carrying tube does not terminate in the interior of the flow passage-defining means and for this reason need not be streamlined. Besides, the carrying tube, which extends through the flow passages defined by the converging end portions of the two pipelines near the runner chamber, permits the provision of a simple mechanism which operatively connects the generator and the runner because the turbine shaft which extends out of the carrying tube into the space between the pipelines is freely accessible. A bevel gear train may be arranged in the space between the pipelines and may be used to establish an operative connection to the generator, which may be supported by the two pipelines. The bevel gear train may be replaced by a belt drive, which connects the turbine shaft to the generator shaft.

If the diameter of the carrying tube is as large as the largest distance between the two pipelines, this will permit a particularly advantageous utilization of space, on the one hand, and the provision of a particularly stiff structure, on the other hand.

To ensure that all parts of the structure which may require to be serviced will be readily accessible, the interior of the carrying tube communicates with the interior of the flow passage-defining means so that the required seal against the driving water is effected at the point where the turbine shaft emerges from that end of the carrying tube which protrudes into the space between the pipelines. That seal is effected in the usual manner by a stuffing box, which in that arrangement is accessible from the space between the two pipelines. Because the carrying tube is filled with driving water, the driving water cannot be contaminated from the carrying tube. This fact is of essential significance for turbine installations installed in drinking water mains. Any leakage water can enter the space between the two pipelines only through the stuffing box but this is no problem.

If the interior of the flow passage-defining means communicates with the interior of the carrying tube, a contamination of the driving water by the means by which the turbine shaft is supported in the carrying tube must be prevented. If the turbine shaft is supported in the carrying tube by a water-lubricated rubber bearing, a contamination by lubricating oil will be prevented. Besides, the water which fills the carrying tube will then act as an emergency lubricant if the separate supply of water to the rubber bearing should fail.

Three embodiments of the invention are shown by way of example in simplified views on the accompanying drawing, in which:

FIG. 1 is a perspective view showing the flow passage-defining means of a turbine installation embodying the invention and comprising a turbine installed in a duct;

FIG. 2 is a longitudinal sectional view showing a turbine installation comprising a turbine installed in a duct;

FIG. 3 is a sectional view taken on line III—III; in FIG. 2;

FIG. 4 is a side elevation showing a modified turbine installation embodying the invention;

FIG. 5 is a sectional view taken on line V—V in FIG. 4; and

Figure 6:
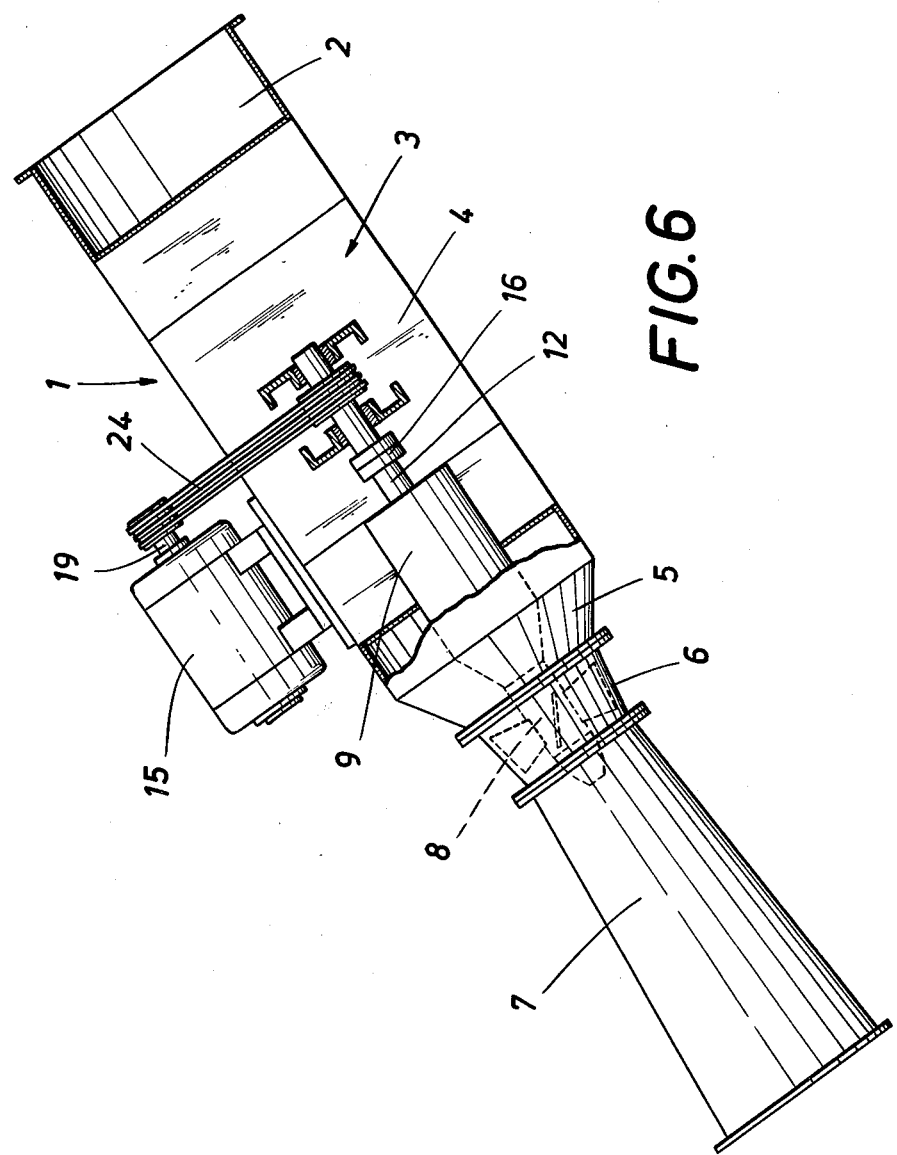
FIG. 6 is a longitudinal sectional view showing another modified turbine installation embodying the invention.

As is particularly apparent from FIG. 1, the flow passage-defining means 1 of a turbine installation according to the invention define an inlet chamber 2 and comprise two pipelines 4, which extend from the inlet chamber 2 and are disposed on opposite sides of an axial center plane and define between them a free space 3. The pipelines 4 converge to form a junction at a runner feed pipe 5, which leads to a runner chamber 6. The latter is succeeded by a diffuser 7. The runner feed pipe 5 has at its inlet end a circular cross-section, which is substantially the same as the cross-section of the inlet chamber 2 at its outlet. The inlet chamber is defined by a pipe. Because each of the pipelines 4 is composed of straight pipe sections which are semicircular in cross-section and their total cross-section is substantially the same as the cross-section of the inlet chamber 2 at its inlet and the cross-section of the runner feed pipe 5 at its inlet, the two pipelines 4 can easily be connected to the outlet opening of the inlet chamber 2 and to the inlet opening of the runner feed pipe 5. The pipelines 4 are virtually the result of a bisecting of the inlet chamber.

The turbine runner 8 is mounted in an upstream carrying tube 9, which extends through and is sealed in pipelines 4 in end portions thereof which converge to a junction at the runner feed pipe 5. The carrying tube protrudes into the space 3 between the two pipelines 4. In order to show clearly how the carrying tube 9 penetrates the confronting planar inner walls 10 of the pipelines 4, a part 11 of the outer wall of one pipeline 4 and of the runner feed pipe 5 is shown in a detached position in FIG. 1.

Owing to this design of the flow passage-defining means 1, the pipelines 4 define between them the space 3, which is freely accessible and in which all parts of the structure which may require to be serviced can be accommodated. This will hardly restrict the design of the mechanism by which the runner 8 is operatively connected to a generator because the carrying tube 9 and the turbine shaft protrude into that free space 3. Although the output mechanism connected to the turbine and the control mechanisms for controlling the turbine can be accommodated in the free space between the two pipelines 4 so that said mechanisms can easily be serviced, there will be favorable conditions of flow so that such turbine installations can be used also where relatively high inlet velocities and high pressures will be encountered. Because the diversion of flow is small and the cross-sections of flow remain substantially constant in a major part of the length of the two pipelines 4. Only adjacent to the junction of the two pipelines 4 before the runner feed pipe 5 is the cross-section of flow decreased by the carrying tube 9; this will result in a desired acceleration of the driving water before it enters the runner chamber 6.

It is apparent from FIG. 2 that the turbine shaft 12 carrying the runner 8 is mounted in the carrying tube 9 near the runner in a water-lubricated rubber bearing 13, which is not shown in detail. The interior of the carrying tube is sealed against the driving water by a stuffing box 14, which constitutes a labyrinth seal and is disposed at that end of the carrying tube that is remote from the runner 8. As a result, the carrying tube 9 is filled with the driving water and the stuffing box 14 is accessible from the space 3 between the two pipelines. For this reason the stuffing box 14 can be serviced even during operation. The mechanism by which the runner 8 is operatively connected to an electric generator 15 comprises the turbine shaft 12 and a rigid coupling 16 connecting the turbine shaft 12 to a bevel gear train 17. The output shaft of that bevel gear train is connected by a flexible coupling 18 to the shaft 19 of the generator 15. The latter is carried by a bracket 20, which spans the free space 3 between the pipelines 4 and is supported by the pipelines 4. The bevel gear train 17 may be mounted on crossbeams 21, which connect the pipelines 4 and hold the pipelines 4 spaced apart. Control motors for controlling the turbine may be accommodated in the space 3 between the two pipelines 4. One of such control motors is indicated at 22.

It is apparent from FIG. 2 that the turbine shaft 12 is supported near its one end by the water-lubricated rubber bearing 13 and near its other end by the bevel gear train 17.

In accordance with FIGS. 2 and 3 the center plane between the two pipelines 4 is vertically oriented so that the generator shaft 19 is vertical too. The invention is not restricted to flow passage-defining means having that orientation, as is apparent from FIGS. 4 and 5, which illustrate an embodiment in which the center plane disposed between the two pipelines 4 and containing the axis of the generator shaft 19 is horizontal. The electric generator 15 can be additionally supported by a foundation 23. If the foundation 23 is provided, the bracket 20 may be omitted.

From FIG. 6 it is apparent that the turbine shaft 12 need not be connected to a bevel gear train. The shaft 19 of the generator is parallel to the turbine shaft 12 and is connected to the latter by a belt drive 24. FIG. 6 shows also that the flow passage-defining means 1 may be inclined. In other respects the turbine installation shown in FIG. 6 also embodies the concept that the flow passage-defining means 1 comprise two separate pipelines, each of which consists of a plurality of straight pipe sections for easy manufacture. As a result, there is a freely accessible space between the two pipelines so that all parts of the structure which may require to be serviced will be freely accessible, substantially irrespective of the size of the turbine installation. For this reason the design which has been described is particularly suitable for turbine installations of small and medium size.

The design proposed by the invention for the means defining a flow passage for the driving water will not impose restrictions as regards the design of the turbine so that turbines having adjustable runner blades, adjustable guide vanes or adjustable runner blades and guide vanes may be used.

What is claimed is:

1. A turbine installation comprising
   (a) flow passage-defining means which comprises
      (1) two juxtaposed pipelines defining interconnecting passages spaced apart in an intermediate part of their length to define a space therebetween, the pipelines being disposed on opposite sides of an imaginary plane,
      (2) an inlet chamber at one end of the pipelines, the inlet chamber having an outlet communicating with each one of the interconnecting passages,
      (3) a runner chamber at an end of the pipelines opposite the one end and having an inlet communicating with each one of the interconnecting passages, and
      (4) a cylindrical feed pipe leading from the opposite end of the pipelines to the runner chamber,
   (b) a turbine runner mounted in the runner chamber for rotation of a fixed axis, the imaginary plane containing said axis,
   (c) an electric generator disposed outside the flow passage-defining means,
   (d) an output mechanism extending through the space and operatively connecting the runner to the generator, the output mechanism comprising
      (1) a turbine shaft for rotation on said axis and non-rotatable connected to the runner, the pipelines being composed of a plurality of pipe sections extending substantially parallel to the axis and having a cross-section that is substantially the same as that part of the cross-section of the inlet chamber at the outlet which is disposed on the same side of the plane as the respective pipeline, and the feed pipe converging to form a junction near the inlet of the runner chamber,
   (e) a carrying tube centered on said axis and radially spaced from, and surrounding, the turbine shaft, the carrying tube extending through, and being sealed in, both pipelines adjacent the junction and the carrying tube protruding into the space, on the one hand, and the cylindrical feed pipe, on the other hand, and
   (f) a bearing for the turbine shaft mounted in the carrying tube.

2. The turbine installation set forth in claim 1, wherein the interior of said carrying tube communicates with the interior of said flow passage-defining means.

3. The turbine installation of claim 1, wherein the diameter of a major portion of the carrying tube equals the largest distance between the pipelines.

4. The turbine installation of claim 2, wherein the bearing is a water-lubricated rubber bearing rotatably mounting the turbine shaft.

* * * * *